United States Patent [19]
Hattori et al.

[11] Patent Number: 5,591,792
[45] Date of Patent: Jan. 7, 1997

[54] ADHESIVE RESIN COMPOSITION

[75] Inventors: Masafumi Hattori; Chikako Ikeda; Satoru Sugimoto; Tatsuoki Saito; Hitoshi Yamada; Etsushi Akashige, all of Yokkaichi, Japan

[73] Assignee: Mitsubishi Chemical Corporation, Tokyo, Japan

[21] Appl. No.: 370,871

[22] Filed: Jan. 10, 1995

[30] Foreign Application Priority Data

Jan. 25, 1994 [JP] Japan .................. 6-006609

[51] Int. Cl.$^6$ ........................... C08L 93/04
[52] U.S. Cl. ............ 524/271; 524/476; 524/477; 524/481; 524/482; 524/483; 524/484; 524/485; 524/486; 524/504; 524/505; 525/71; 525/98
[58] Field of Search .................. 524/271, 505, 524/504, 476, 477, 481, 482, 483, 484, 485, 486; 525/98, 64, 71

[56] References Cited

U.S. PATENT DOCUMENTS

| | | | |
|---|---|---|---|
| 4,918,730 | 4/1990 | Kano et al. | 525/98 X |
| 5,206,284 | 4/1993 | Fukui et al. | 524/504 |
| 5,264,476 | 11/1993 | Daimon et al. | 524/271 |
| 5,286,781 | 2/1994 | Gotoh et al. | 524/271 X |

FOREIGN PATENT DOCUMENTS

| | | |
|---|---|---|
| 0411191 | 2/1991 | European Pat. Off. . |
| 0412503 | 2/1991 | European Pat. Off. . |
| 0501296 | 9/1992 | European Pat. Off. . |

*Primary Examiner*—Judy M. Reddick
*Attorney, Agent, or Firm*—Oblon, Spivak, McClelland, Maier & Neustadt, P.C.

[57] ABSTRACT

The invention relates to an adhesive resin composition comprising an ethylene polymer having a melting point of 70 to 132° C., a density of 0.88 to 0.94% g/cm$^3$ and a melt flow rate (MFR) of 0.05 to 50 g/10 min. and/or a modified product thereof with an unsaturated carboxylic acid or its derivative (component A); a tackifier (component B); and a block copolymer containing at least one polymer block mainly composed of a vinyl aromatic hydrocarbon and at least one polymer block mainly composed of a conjugated diene or a hydrogenated product thereof (component C). This composition is useful as an adhesives showing excellent adhesion over a wide temperature range as well as processability by film molding, sheet molding, blow molding, etc. It is available for laminates comprising various kinds of resins such as polyolefins, styrenic resins, polyesters, acrylic resins and polyamides.

28 Claims, No Drawings

ADHESIVE RESIN COMPOSITION

BACKGROUND OF THE INVENTION

1. Field of the Invention

The present invention relates to an adhesive resin composition for a laminate having improved properties such as gas barrier properties (against oxygen, carbon dioxide gas and so on), mechanical strength, barrier properties against contents involved therein (e.g. flavor and odor protection) and appearance (e.g. surface gloss and transparency) which are widely required for various industrial applications such as food packaging materials.

More specifically, the present invention relates to adhesive resin compositions which can be widely used in various fields for lamination of materials independently selected from the group consisting of gas barrier resins, metals such as steel plate and aluminum foil, etc, polyolefins (hereinafter, sometimes abbreviated as "PO") such as polypropylene, polyethylene and 4-methyl-1-pentene resin; styrenic resins (hereinafter, sometimes abbreviated as "PS") such as general-purpose (GP) polystyrene, high-impact (HI) polystyrene, styrene/methacrylic acid copolymers, acrylonitrile/styrene resins, acrylonitrile/butadiene/styrene resins and modified acrylonitrile/butadiene/styrene resins; polyester resins (hereinafter, sometimes abbreviated as "PES") such as poly(ethylene terephthalate) (PET), PET copolymer, poly(butylene terephthalate) (PBT), poly(ethylene naphthalate) (PEN) and poly(cyclohexylene terephthalate) (PCT); polycarbonate (hereinafter, sometimes abbreviated as "PC"); acrylic resins (hereinafter, sometimes abbreviated as "PAN") such as polyacrylonitriles, acrylonitrile/methyl acrylate/butadiene copolymers and poly(methyl methacrylate); saponified ethylene/vinyl acetate copolymers (EVOH) having ethylene content of 15 to 65 mole% and saponification value of not less than 90% or their mixtures with at least one kind selected from polyamide, polyester, polycarbonate and platelet fillers (hereinafter, sometimes abbreviated as "EVOH resins, etc."); polyamide (hereinafter, sometimes abbreviated as "PA") such as nylon 6, nylon 66, nylon 6-66, nylon 12 and polyamide containing xylylene group; and so on.

2. Related Art

In various fields, polyolefins such as polypropylene and polyethylene and styrene-based resins such as HI polystyrene and GP polystyrene have been widely used. Polyolefins have excellent moldability, mechanical strength and chemical resistance, but are not so good in gas barrier properties and barrier properties against contents of the finished articles and may be impaired in appearance (e.g. surface gloss and transparency) depending on the methods for molding or the kinds of resins employed. On the other hand, styrene-bases resins have excellent moldability and stiffness, but are not so good in gas barrier properties and oil resistance.

For the improvement of these defects, various techniques have been proposed, such as lamination with EVOH or polyamide which have excellent gas barrier properties. In addition, polyolefins are recommended for lamination with polyester or polycarbonate in order to improve barrier properties to contents and appearance. Polystyrene are recommended for lamination with polyolefins having excellent oil resistance, such as polypropylene and polyethylene. Acrylonitrile/styrene resins and acrylonitrile/butadiene/styrene resins are also recommended for lamination with metals or polyolefins.

However, since polyolefins or polystyrenes have no polar group, if they are directly laminated with EVOH or a polyamide, the interfacial adhesion is extremely weak. These polymers also exhibit similar weak interlayer adhesion to other resins. Therefore, these polymers are not practically available as lamination materials.

For improving such defect, the use of various adhesives have been proposed. For example, for the bonding of PO with polar resins such as EVOH and PA, polyolefin adhesive resin modified with unsaturated carboxylic acid and its derivative are generally used as the adhesives, which has no problem in practical application.

On the other hand, as for the laminates of PO with resins other than EVOH and PA, that is, the laminates of PO with PES, PC, PAN, PS and so on, various adhesives have been proposed such as a composition of an olefinic polymer and an alicyclic or aromatic polymer (see Japanese Patent Laid-open No. 50-116536), a composition of an ethylene/vinyl acetate copolymer (hereinalter, abbreviated as "EVA") and a tackifier (see Japanese Patent Laid-open Nos. 53-147733 and 54-10384), a composition of an EVA and an aliphatic petroleum resin as a tackifier (see Japanese Patent Laid-open No. 53-127546), a composition of a modified crystalline ethylene/α-olefin random copolymer and a tackifier (see Japanese Patent Laid-open No. 61-241144), a composition of a low crystalline (low-density) ethylene/α-olefin random copolymer, a tackifier and a modified polyethylene (see Japanese Patent Laid-open No. 61-162539), a hot melt adhesive composition comprising a mixture of a styrenic thermoplastic elastomer, a tackifier, a low molecular weight polypropylene and a process oil (see Japanese Patent Laid-open No. 64-144483), a hot melt adhesive composition comprising a SBS, a SEBS, an alicyclic tackifier and a cyclo-olefin random copolymer (see Japanese Patent laid-open No. 3-223381), and so on.

In any of the methods described above, however, a composition of an elastomer having a low density (i.e. low crystallinity), a waxy low molecular weight resin or an EVA and a tackifier is used as an adhesives. Therefore, the laminate of a PO resin with a PES, a PC, a PAN or a PS, or the laminate of a PS resin with an EVOH resin, a PA resin, a PES resin or a PC shows insufficient adhesive strength at ordinary temperatures (around 23° C.), as well as at medium temperatures (around 60° C.) where the postforming of the molded article (e.g. punching of the article after vacuum forming, flash cutting of the article after blow molding, etc.) is carried out and at the high temperatures (around 90° C.) required for the boil sterilization of the molded article; which is still remains a problem for practical application at the present time.

SUMMARY OF THE INVENTION

The object of the present invention is to provide an adhesive material having an excellent adhesive strength at a wide temperature range from low temperatures to high temperatures and an excellent processability to extrusion moldings such as film, sheet and blow moldings, suitably used for laminates of PO with PES, PC, PAN and PS and laminates of PS with EVOH, PA, PES and PC.

The present inventors have carried out extensive studies to accomplish this object. As a result, it was found that a composition mainly comprising an ethylene copolymer having excellent thermal resistance and high density and melting point suitable for extrusion molding as an essential component and further incorporated with small amounts of a tackifier and a block copolymer composed of at least one polymer block mainly composed of a vinyl aromatic hydrocarbon and at least one polymer block mainly composed of a conjugated diene or a hydrogenated product thereof (hereinafter, sometimes referred to as "styrenic thermoplastic elastomer") can show a stable adhesive strength to various materials at a wide temperature range from low temperatures to high temperatures. This discovery led to the present invention.

That is, the present invention can provide an adhesive resin composition comprising an ethylene polymer and/or a modified product thereof with an unsaturated carboxylic acid or its derivative (component A), a tackifier (component B) and a block copolymer containing at least one polymer block mainly composed of a vinyl aromatic hydrocarbon and at least one polymer block mainly composed of a conjugated diene or a hydrogenated product thereof (component C), and optionally further comprising an ethylene/α-olefin random copolymer and/or a modified product thereof with an unsaturated carboxylic acid or its derivative (component D), which composition has excellent interlayer adhesion to various kinds of materials at a wide temperature range from low temperatures to high temperatures, excellent processability and heat stability.

DETAILED DESCRIPTION OF THE INVENTION (1) Ethylene polymer and modified ethylene polymer with unsaturated carboxylic acid or its derivative (Component A)

(i) Ethylene polymer (Component $A_1$)

The ethylene polymer (Component $A_1$) to be used in the present invention is a high pressure process polyethylene (generally abbreviated as "LDPE") which can be produced by a radical polymerization method, or a linear ethylene/α-olefin copolymer which can be produced by gas phase polymerization, solution polymerization, liquid phase slurry polymerization and the like in the presence of a catalyst such as a Ziegler catalyst comprising a titanium(Ti) compound, a Philips catalyst comprising a chromium(Cr) compound or a recently noted metallocene catalyst comprising a zirconium(Zr)-, titanium(Ti)- or hafnium(Hf) compound, a high density polyethylene (generally abbreviated as "HDPE"), a middle density polyethylene (generally abbreviated as "MDPE"), a linear low density polyethylene (generally abbreviated as "LLDPE"), a very low density polyethylene (generally abbreviated as "VLDPE"), a low crystalline ethylene/butene-1 random copolymer (generally abbreviated as "EBM") or the like.

In the ethylene/α-olefin copolymer indicated above, the α-olefin to be commonly employed is an α-olefin having 3 to 20 carbon atoms and containing acyclic moiety and no cyclic moiety, such as propylene, 1-butene, 1-hexene, 4-methyl-1-pentene, 1-octene, 1-decene, 1-tetradecene and 1-octadecene, which may be used alone or as a mixture of two or more of them.

The ethylene polymer (Component $A_1$) to be used in the present invention has a melting point (as determined by DSC) of 70° to 132° C., preferably 80° to 132° C., and a density (as determined according to JIS K7112) of 0.88 to 0.945 g/cm$^3$, preferably 0.89 to 0.94 g/cm$^3$. The ethylene polymer preferably has a MFR (as determined according to JIS K7210 under the conditions of No. 4 shown in Table 1 thereof) of 0.05 to 50 g/10 min., more preferably 0.1 to 30 g/10 min.

If the melting point of the polymer is less than 70° C., the resultant composition exhibits poor adhesive strength at 60°C. or higher. On the other hand, if the melting point is over 132° C., the resultant composition shows impaired adhesive strength at ordinary temperatures, as well as at high temperature.

If the density of the polymer is less than 0.88 g/cm$^3$, the resultant resin composition exhibits poor adhesive strength at 60° C. where the postforming for a laminate is carried out. On the other hand, if the density is over 0.945 g/cm$^3$, the resultant composition shows impaired adhesive strength at ordinary temperatures and higher temperatures.

If the MFR of the polymer is outside of the range specified above, the resultant composition exhibits lower or higher melt viscosity, and therefore possess low processability.

In addition, it is further preferable that the ethylene polymer has a crystallinity as determined by X-ray diffractometry of about 13 to 65%, preferably 16 to 65% and more preferably 20 to 65%, from the viewpoint of adhesive strength at ordinary temperatures and higher temperatures and moldability of the resultant resin composition.

(ii) Modified ethylene polymer (Component $A_2$)

The modified ethylene polymer (Component $A_2$) to be used in the present invention is a graft polymer of the ethylene polymer described above with an unsaturated carboxylic acid or its derivative.

In the modification of the ethylene polymer by graft polymerization, any conventional method can be used. For example, an ethylene polymer (including at least one kind of mixture with, for example, a LLDPE, and a VLDPE or an EPR) is first blended with a graft monomer and the mixture is then melted in an extruder to be graft-copolymerized, or an ethylene polymer (including at least one kind of mixture) is dissolved in a solvent and then a radical initiator and a graft monomer are further added to be graft-copolymerized.

In the present invention, the graft-modification is preferably carried out at 80° to 300° C.

The amount of the radical initiator to be generally employed is preferably within the range from 0.001 to 8 parts by weight based on 100 parts by weight of the ethylene polymer (Component $A_1$).

As the radical initiator to be used, an organic peroxide is generally used. Preferably employed are 2,5-dimethylhexane-2,5-dihydroperoxide, 2,5-dimethyl-2,5-di(tertbutylperoxy) hexyne-3, di-tert-butylperoxide, tert-butylcumylperoxide, 2,5-dimethyl-2,5-di(tert-butylperoxy) hexane, dicumylperoxide, tert-butylperoxybenzoate, tert-butylperoxyacetate, tert-butylperoxyisopropylcarbonate, benzoylperoxide and m-toluoylperoxide.

As the unsaturated carboxylic acid and the derivative thereof to be used, there are preferably employed, for example, unsaturated monocarboxylic acid such as acrylic acid and methacrylic acid; unsaturated dicarboxylic acids such as maleic acid, fumaric acid, itaconic acid and citraconic acid; and the derivatives thereof such as anhydrides, amides, imides and esters. These compounds may be used alone or as a mixture of two or more of them. Among these, more preferable are unsaturated dicarboxylic acids and anhydrides thereof, and especially preferable are maleic acid and its anhydride.

The grafting amount of the unsaturated carboxylic acid or the derivative thereof (as determined by an infrared spectrometry) is 0.01 to 10 wt %, preferably 0.05 to 7 wt %, and more preferably 0.1 to 5 wt %. The grafting amount of less than 0.01 wt % leads to the decrease in adhesion of the resultant resin composition to EVOH, PA and so on; whereas a grafting amount of over 10 wt % not only causes the partially crosslinking during the graft polymerization process, resulting in decrease in moldability of the resultant resin composition, but also causes the generation of fisheyes and lumps, resulting in deterioration in appearance of the finished article, and further leads to the deterioration in adhesion to other resins.

The MFR of the modified ethylene polymer is 0.3 to 50 g/10 min. and preferably 0.5 to 30 g/10 min. When the MFR is out of this range, the resultant resin composition exhibits poor moldability.

The density of the modified ethylene-based polymer is 0.88 to 0.945 g/cm$^3$ and preferably 0.89 to 0.94 g/cm$^3$. A density of less than 0.88 g/cm$^3$ leads to poor adhesive strength at 60° C. where the postforming ior a laminate is carried out; whereas a density of over 0.945 g/cm$^3$ leads to the decrease in adhesive strength at ordinary temperatures and higher temperatures.

The modified polyethylene-based polymer sometimes may contain unreacted graft monomer residue depending on the modified methods to be employed. However, from the viewpoints of adhesion and food sanitation as required when used in adhesive materials for food containers, the residue should be removed as much as possible. For this reason, the modified polyethylene polymer is preferably subjected to post-treatment for removal of any unreacted graft monomer residue, such as extraction with a poor solvent (e.g. acetone) and degassing the residue by thermal dryer.

(2) Tackflier (Component B)

The tackifier to be used in the present invention is an amorphous resin showing a solid state at ordinary temperatures, which is conventionally used as a tackifier for pressure-sensitive adhesive tapes, hot melt adhesives, paints and the like. Preferably employed is a petroleum resin, a rosin, a terpene resin or a hydrogenated compound thereof, and may be suitably selected from commercially available products for practical use.

The petroleum resin to be used is, for example, an aliphatic petroleum resin, an aromatic petroleum resin, a copolymer thereof or a hydrogenated compound thereof. Specific examples of commercially available petroleum resins include "TOHO-HIRESIN" (a trade name for a product of Toho Sekiyu Jushi Kabushiki Kaisha), "PICCOPALE" (a trade name for a product of Pico Corporation), "ARKON-P and-M" (trade names for products of Arakawa Chemical Industries, Ltd.), "ADMARV" (a trade name for a product of Idemitsu Petrochemical Co., Ltd.), "SUPER STA-TAC" (a trade name for a product of Richhold Corporation), "ESCOREZ" (a trade name for a product of Esso Chemical, Ltd.), "TOHO PETRORESIN" (a trade name for a product of Tonen Sekiyu Jushi Kabushiki Kaisha), "HI-REZ" (a trade name for a product of Mitsui Petrochemical Industries, Ltd.), "QUINTONE" (a trade name for a product of Nippon Zeon Co., Ltd.) and so on.

The rosin to be used is a natural rosin, a polymerized rosin or a derivative thereof, such as pentaerythritol ester rosin, glycerol ester rosin, and a derivative thereof. Specific examples of commercially available rosin include "GUM-ROSIN", "WOODROSIN", "ESTERGUM-A", "PENSEL-A" and "PENSEL-C" (trade names for products of Arakawa Chemical Industries, Ltd.), "PENTALYN-A", "PENTALYN-C" and "FORAL 105" (trade names for products of Rika Hercules, Ltd.), and so on.

The terpene resin to be used is a polyterpene resin, a terpenephenol resin or a hydrogenated product thereof. Specific examples of commercially available terpene resins include "PICCOLYTE-S and -A" (trade names for products of Pico Corporation), "YS-RESIN" and "CLEARON" (trade names for products of Yasuhara Chemical Industry, Co., Ltd.) and so on.

In the present invention, the tackifier is suitably selected from the compounds described above depending on the application of the resultant composition. However, among these, preferably employed are the compounds having softening points of 70° to 150° C. and more preferably employed are those having softening points of 90° to 150° C. In case of a tackifier having a softening point of less than 70° C., the adhesive strength is insufficient and the melt-miscibility with an ethylene resin becomes poor. On the other hand, in case of a tackifier having a softening point of over 150° C., which is not commercially available at the present time, the adhesion at ordinary temperatures tends to be decreased. In order to have the color of the adhesive resin composition of the present invention approach a natural color (white or colorless and transparent; preventing yellowish coloring) as much as possible, the tackifier is preferably an aliphatic petroleum resin, an aromatic petroleum resin or a copolymer thereof. Especially preferable is a hydrogenated product of the resin or copolymer described above, which preferably has a degree of hydrogenation of at least 80%, more preferably at least 90%.

(3) Block copolymer or hydrogenated product thereof (Component C)

The block copolymer containing at least one polymer block mainly composed of a vinyl aromatic hydrocarbon and at least one polymer block mainly composed of a conjugated diene or a hydrogenated product thereof to be used in the present invention is a block copolymer represented by the following general formulas and mixtures thereof: A-B; A-B-A; B-A-B-A; or A-B-A-B-A (wherein A represents a thermoplastic polymer block mainly composed of a vinyl aromatic hydrocarbon; and B represents an elastomeric polymer block mainly composed of a conjugated diene or an olefin polymer block produced by hydrogenating said polymer block; hereinafter, abbreviated as A-B-A type or A-B type of block copolymer).

The compound mainly composed of a vinyl aromatic hydrocarbon, which is a constituent of the polymer block A, is at least one compound selected from the group consisting of styrene, $\alpha$-methyl styrene, vinyltoluene and so on. Among these, styrene is preferably employed.

The conjugated diene to be used is at least one compound selected from the group consisting of butadiene, isoprene, 1,3-pentadiene and so on. Among these, butadiene, isoprene and the combination thereof are preferably employed.

The amount of the polymer block mainly composed of a vinyl aromatic hydrocarbon, i.e. the polymer block A, to be contained is 10 to 80 wt %, and preferably 10 to 70 wt %. Too small or too large amount of this polymer block disadvantageously leads to a decrease in adhesive strength of the resultant resin composition.

When the hydrogenated product of the polymer block mainly composed of a conjugated diene is used, the degree of the hydrogenation is generally not less than 90%, and more preferably not less than 95%. The higher the degree of hydrogenation the more improved the heat stability of the resultant resin composition becomes.

The block copolymer (component C) has a number average molecular weight of about 10,000 to 400,000, and preferably 20,000 to 300,000. Larger or smaller molecular weights outside of this range leads to a decrease in adhesive strength of the resultant resin composition. In addition, when a block copolymer having a number average molecular weight of over 400,000 is used, the resulting composition disadvantageously exhibits poor processability.

When the block copolymer (component C) has a relatively higher number average molecular weight, even though within the above-specified range, a processing aid selected from the group consisting of process oils, liquid polybutadiene and olefinic waxes having number average molecular weights of not larger than 6,000 may be added thereto in an amount of 1 to 40 wt % based on the amount of the copolymer or the hydrogenated product thereof for effectively preventing a decrease in adhesive strength and processability of the resultant resin composition.

In the present invention, a block copolymer having the A-B-A structure is preferably employed as the component C. Typical examples of the block copolymer and commercially available products thereof include hydrogenated styrene/ butadiene block copolymers such as "TUFTEC-H" (a trade name for a product of Asahi Chemical Industry Co., Ltd.) and "KRATON-G1600" series (a trade name for a product of Shell Chemical Ltd.); hydrogenated styrene/isoprene block copolymers such as "SEPTON-2000" series (a trade name for a product of Kuraray Co., Ltd.); styrene/butadiene block copolymers; and styrene/isoprene block copolymers such as "CARIFLEX-TR" (a trade name for a product of Shell Chemical Ltd.) and "VECTOR" (a trade name for a product of DEXCO CORPORATION). Hydrogenated styrene/isoprene block copolymers, which have the A-B structure, are also useful, such as "SEPTON-1000" series (a trade name for a product of Kuraray Co., Ltd.) and "KRATON-G1700" series (a trade name for a product by Shell Chemical Ltd.).

(4) Ethylene/α-olefin random copolymer and/or modified ethylene/α-olefin random copolymer (Component D)

In the adhesive resin composition of the present invention, an ethylene/α-olefin random copolymer and/or a modified ethylene/α-olefin random copolymer (component D) may be additionally used, whereby the adhesion of the resultant resin composition can be further improved.

(i) Ethylene α-olefin random copolymer (Component $D_1$)

The ethylene/α-olefin random copolymer (Component $D_1$) to be used in the present invention is mainly composed of ethylene copolymerized with α-olefin. This copolymer can be produced by solution polymerization, liquid phase slurry polymerization and the like in the presence of a vanadium compound as a catalyst.

The α-olefin to be used for this copolymer is one having 3 to 20 carbon atoms, such as propylene, 1-butene, 1-hexene, 1-octene, 1-decene, 1-tetradecene, 1-octadecene and 4-methyl-1-pentene. These compounds may be used alone or as mixtures of two or more of them. Among these, propylene is especially preferable.

This copolymer has a melting point of not larger than 60° C., a density of 0.85 to 0.87 g/cm$^3$ and an MFR of 0.1 to 50 g/10 m min. Examples of such copolymers include ethylene/ propylene elastomers (EPR), ethylene/butene-1 elastomers (EBR), propylene/butene-1 elastomers (PBR) and so on.

When the melting point is over 60° C. and the density is over 0.87 g/cm$^3$, the adhesive strength of the resultant resin composition is not much improved. When the MFR is smaller or larger than the above-specified range, not only is the adhesive strength of the composition not improved, but also the moldability is decreased.

(ii) Modified ethylene/α-olefin random copolymer (Component $D_2$)

The modified ethylene/α-olefin random copolymer (component $D_2$) is a graft polymer of the ethylene/α-olefin random copolymer described above with an unsaturated carboxylic acid or a derivative thereof.

In the production of this modified product by graft polymerization, the same procedures, the same radical initiators and the same unsaturated carboxylic acids or the derivatives thereof can be employed as those described in the above section of "(1) (ii) modified ethylene-based polymer (component A2)"

The amount of the unsaturated carboxylic acid or the derivative thereof to be grafted, as determined by an infrared spectrometry, is 0.01 to 10 wt %, preferably 0.05 to 7 wt % and especially preferably 0.1 to 5 wt %. Ii it is less than 0.01 wt %, the adhesion of the resultant resin composition to EVOH and PA becomes poor. On the other hand, if it is over 10 wt %, partially crosslinking occurs during the graft copolymerization process, which leads not only to a decrease in moldability but also to the undesirable generation of fisheyes and lumps in the compound, resulting in poor appearance of the finished article. In this case, the adhesion of the resultant composition is also decreased disadvantageously.

The modified ethylene/α-olefin random copolymer preferably has a density of 0.85 to 0.87 g/cm$^3$, a melting point of not higher than 60° C., and an MFR of 0.3 to 50 g/10 min. and preferably 0.5 to 30 g/10 min.

When the melting point is over 60° C. and the density is over 0.87 g/cm$^3$, the adhesive strength of the resultant resin composition is not much improved. When the MFR is outside of the above-specified range, the moldability of the resin composition is decreased.

(5) Resin composition

The resin composition of the present invention essentially comprises: an ethylene polymer and/or a modified product thereof with an unsaturated carboxylic acid or its derivative (component A); a tackifier (component B); a block copolymer containing at least one polymer block mainly composed of a vinyl aromatic hydrocarbon and at least one polymer block mainly composed of a conjugated diene or a hydrogenated product thereof (component C); and, optionally, an ethylene/α-olefin random copolymer or a modified product thereof (component D), in a blending ratio as follows:

That is, the amount of the component A to be blended is 40 to 98 wt %, preferably 40 to 85 wt % and more preferably 40 to 70 wt %; the amount of the component B to be blended is 1 to 59 wt %, preferably 5 to 45 wt % and more preferably 5 to 30 wt %; the amount of the component C to be blended is 1 to 59 wt %, preferably 3 to 50 wt % and more preferably 5 to 40 wt %; and the amount of the component D to be blended is 1 to 50 wt %, preferably 5 to 40 wt % and more preferably 5 to 30 wt %, each amount being based on the total amount of the components A, B and C.

The content of the component A of less than 40 wt % leads to a decrease not only in adhesive strength at higher temperatures but also in moldability of the resultant resin composition; whereas the content of the component A of larger than 98 wt % leads to poor adhesive strength of the resultant resin composition at ordinary temperatures; which are not desirable.

As for the components B and C, the contents of less or greater than the above-specified ranges also leads to poor adhesive strength of the resultant resin composition. In particular, when the content of the component B is large enough to be outside of the above range, not only the adhesive strength but also the moldability of the resin composition are decreased disadvantageously.

When the resin composition of the present invention is laminated onto an EVOH or a PA, the resin composition should be blended with the component $A_2$ for increasing the adhesion to these resins. When the resin composition is laminated onto a PO such as polypropylene and polyethylene, a PES, a PC or a PS, the resin composition need not contain the component $A_2$ for imparting sufficient adhesive strength; however, the blend of component $A_2$ into the resin composition offers no problems in adhesive strength.

The adhesive resin composition of the present invention can be produced by mixing the components described above by a known mixer such as a tumble mixer, a V-shaped blender, a ribbon blender or a Henschel mixer and then melt-kneading the resultant mixture using a single-screw extruder, a twin-screw extruder, a Banbury mixer or a kneader to be pelletized or finely divided. Another process may be employed, in which some of the components to be blended are premixed and the resultant premixture is then subjected to the melt-kneading using a twin-screw extruder while introducing the other components, for example, a tackifier (component B) and a block copolymer or a hydrogenated product thereof (component C), through a twin-screw extruder in the middle thereof; whereby all components are melt-kneaded completely.

The composition of the present invention may further contain additives such as antioxidants, weathering stabilizers, lubricants, antistatic agents, neutralizing agents for catalyst residue, pigments, dyes, inorganic fillers and/or organic fillers and so on, in amounts which do not impair the objects of the present invention.

(6) Laminates

The adhesive resin composition of the present invention can be used as an adhesive layer for laminates comprising at least two kinds of materials independently selected from the group consisting of polypropylene, polyethylene, 4-methyl-1-pentene resins, styrenic resins, polyester, polycarbonate, acrylic resins, polyamide, saponified ethylene/vinyl acetate copolymers, polyoxymethylene, cyclo-olefin copolymers (COC), aluminum foil, iron plates, etc.

For the production of the laminate, any known method may be employed. Examples of such methods include co-extrusion methods such as blown film molding, T-die film molding and blow molding for the molding of bottles and vacuum forming and pressure forming from a sheet for the molding of containers such as cups, in which individual resins for the lamination layers previously melted in separate extruders are supplied into a multilayer die to be laminated in the die; co-injection molding in which individual resins for the lamination layers previously melted in separate extruders are injected into a mold one after another at certain time lags; and a stretch molding of the co-injection molded product for the molding of containers such as cups and bottles.

The thickness of the multilayer structure using the composition of the present invention as an adhesive layer is generally 1 to 500 μm and preferably 1 to 300 μm, which may be adjusted depending on the application or the required qualities of the multilayer structure.

EXAMPLES

The present invention will be illustrated in detail by the following examples.

Further, the examples and comparative examples were evaluated according in the following manners:
(1) The production of a laminate was carried out according to the following methods A or B:
[Method A]
Water-quenching three-layer co-extrusion blown film molding using three kinds of materials

|  | Layer structure of film: | | |
|---|---|---|---|
|  | (inside) LLDPE / | (intermediate) the composition of the invention / | (outside) adherend |
| Extruders: | 100 μm 40 mmφ | 100 μm 40 mmφ | 100 μm 40 mmφ |

Molding conditions for each adherend:
 Co-extrusion temperature
  a. Polyester and polycarbonate: 280° C.
  b. Polyamide: 250° C.
  c. EVOH: 230° C.
  d. Acrylic resin: 200° C.
 Molding speed: 10 m/min.

As the LLDPE, "MITSUBISHI-POLYETHY-LL, UF330" (a product commercially available from Mitsubishi Petrochemical Co., Ltd.; density: 0.92 g/cm$^3$; MFR: 1.0 g/10 min.) was used.

Method B]
Five-layer co-extrusion sheet using three kinds of materials
Layer structure of sheet:
 various adherends (450 μm)/the composition of the invention (40 μm)/gas barrier resin (30 μm)/the composition of the invention (40 μm)/various adherends (450 μm)
Molding conditions for each adherend:
 Co-extrusion temperature
  a. Polystyrene: 230° C.
  b. Polyethylene and polypropylene: 230° C.
  c. EVOH: 230° C.
 Molding speed: 2 m/min.

(2) The adhesive strength (kg/10 mm) of laminate was measured according to JIS K-6854 under the following conditions:
 Peeling width: 10 mm
 Peeling mode: T-peel
 Peeling speed: 50 mm/min.
 Peeling temperature: 23° C. and 60° C.

(3) Boiling treatment

The laminate using the composition of the present invention, which had been produced by Method A described above was heat-sealed on the LLDPE face thereof and then made into a pauch. In this pauch laminate, 100 cc of the following mixed solution was packed. The resultant was treated in a hot water of 90° C. for 30 minutes, then taken out from the hot water and cooled in 23° C. water (for 30 minutes), to give a sample to be examined.

The mixed solution:
 a mixture of water: vinegar: salad oil =1:1:1

Examples 1 to 11 and Comparative Examples 3 and 4

The ethylene polymer (ethylene homopolymer or ethylene/α-olefin copolymer; component A) selected from Nos. 1 to 5 indicated in Table A$_1$, the tackifier (component B) of No. C indicated in Table B, the hydrogenated styrene-butadiene block copolymer having the A-B-A structure (component C) of No. II indicated in Table C and the modified ethylene copolymer (component A$_2$) of No. a or a' indicated in Table A$_2$ were previously mixed in the mixing ratio indicated in the table for Examples and Comparative Examples using a 50-liter V-shaped blender for five minutes. The resultant mixture was melt-blended using a twin-screw extruder "PCM 30" (D=30 mmφ; L/D=32; produced by Ikegai Tekko Kabushiki Kaisha) at 200° C. at a 200 rpm of screw revolutions per minutes at 10 kg/hr of extrusion speed, to be extruded in a strand form. The resultant was cooled and then cut into pellets; thus the test samples of the composition for each example were prepared.

The thus prepared pellets were used for the production of three-layer film using three kinds of materials according to Method A described above using a polyester "DIANITE-PA500" (specific gravity: 1.34 g/cm$^3$; inherent viscosity:

0.76 dl/g; a product by Mitsubishi Rayon Co., Ltd.), an EVOH "EVAL EP-F101" (density: 1.19 g/cc; melt index; 1.3; ethylene content: 32 mol %; a product by Kuraray Co., Ltd.) and a LLDPE, respectively, as the adherend. The resultant films were evaluated for their adhesive strength, at 23° C. and 60° C. for the films using polyester and EVOH and at 23° C. after the bowling treatment (at 90 C. for 30 minutes) for the film using polyester. The results are shown in Table 1 (Examples 1 to 11) and Table 4 (Comparative Examples 3 and 4).

Examples 12 and 27

Example 7 was repeated except-lot using the ethylene/propylene random copolymer of No. ② or ③ in Table $D_1$ in place of the ethylene-based copolymer (ethylene-butene-1 copolymer; No. 5 in Table $A_1$). The results are shown in Table 1.

Example 13 and Comparative Examples 1 and 2

Example 1 was repeated except for using an ethylene/butene-1 copolymer having different physical properties (No. 7 in Table $A_1$), a high density polyethylene (HDPE) (No. 6 in Table $A_1$; component $A_1$) or a low density ethylene/propylene random copolymer (No. ① in Table $D_1$: component $D_1$) in place of the ethylene-butene-1 copolymer (No. 1 in Table $A_1$). The results of Example 13 are shown in Table 1 and the results of Comparative Examples 1 and 2 are shown in Table 4.

Examples 14 to 17

Example 1 was repeated except for using the compounds of Nos. b and c indicated in Table $A_2$ and No. d indicated in Table $D_2$ in place of the modified ethylene polymer of No. a indicated in Table $A_2$. The results are shown in Table 1.

Examples 18 to 22

Example 3 was repeated except for using the tackifier of Nos. A, B and D to F in Table B (component B) in place of the tackifier (No. C in Table B). The results are shown in Table 1.

Examples 23 to 26

Example 1 was repeated except for using the compounds of No. I and III to V indicated in Table C (component C) in place of the hydrogenated styrene-butadiene block copolymer (SEBS) of No. II indicated in Table C having the A-B-A structure. The results are shown in Table 1.

Example 28

Laminates were prepared using the composition of Example 3 in the same manner as Example 1, except for using the following resins other than a poly(ethylene terephthalate) "PA500" and an EVOH "EPF101" according to Method A or B. The results are shown in Table 2.

1. Poly(ethylene terephthalate) copolymer:
   "Kodar PETG6763" (a product by Eastman Kodak Corporation; density: 1.27 g/cm³; IV value: 0.75)
2. Poly(butylene terephthalate):
   "DURANEX 660LP" (a product by Polyplastics Co., Ltd.; density: 1.31 g/cm³; IV value: 1.0)
3. Polycarbonate:
   "IUPOLON E2000" (a product by Mitsubishi Gas Chemical Co., Ltd.; density: 1.2 g/cm³; limiting viscosity: sp: 0.65)
4. Acrylonitrile resin:
   "BAREX 3000" (a product by Mitsui Toatsu Chemicals, Inc.; density: 1.15 g/cm³; MFR: 30 g/10 min.)
5. Poly(m-xylylene diamine adipate):
   "MX NYLON 6001" (a product by Mitsui Gas Chemical Co., Ltd.; specific gravity: 1.22 g/cm³; relative viscosity: 2.1; MI: 7 g/10 min.)
6. GP polystyrene:
   "DENKASTYROL HRM-5" (a product by Denki Kagaku Kogyo Kabushiki Kaisha; specific gravity: 1.05 g/cc; MFR: 3.5 g/10 min.)
7. HI polystyrene:
   "DENKASTYROL HI-G-2" (a product by Denki Kagaku Kogyo Kabushiki Kaisha; specific gravity: 1.04 g/cc; MFR: 2 g/10 min.)
8. Polypropylene:
   "MITSUBISHI POLYPRO PY220" (a product by Mitsubishi Petrochemical Co., Ltd.; density: 0.90 g/cm³; MFR: 1.4 g/10 min.; homopolymer)
9. Polyethylene:
   "MITSUBISHI POLYETHY-HD BZ50A" (a product by Mitsubishi Petrochemical Co., Ltd.; density: 0.953 g/cm³; MFR: 0.35 g/10 min.)
10. Polyethylene:
    "MITSUBISHI POLYETHY-LD NC82" (a product by Mitsubishi Petrochemical Co., Ltd.; density: 0.928 g/cm³; MFR: 0.3 g/10 min.)
11. ABS:
    "POLYLAC PA747A" (a product by Che Mei Co., Ltd.; specific gravity: 1.03 g/cm³; MFR: 0.6 g/10 min.)

Example 29

Example 1 was repeated except for using ethylene/butene-1 copolymer (MFR: 2.2 g/10 min.; density: 0.91 g/cm³; comonomer content: 13 wt %; crystallinity (by X-ray diffractometry): 31%; component $A_1$) which was prepared by polymerizing in the presence of a metallocene catalyst. The results are shown in Table 3.

TABLE $A_1$

| | | | Ethylene Polymer | | | |
|---|---|---|---|---|---|---|
| No. | Polymer Type | MFR (g/10 min.) | Density (g/cm³) | Melting Point (°C.) | Kind of α-Olefin (content mol %) | Degree of Crystallinity (%) |
| 1 | VLDPE | 2 | 0.89 | 87 | 1-butene (9) | 21 |
| 2 | VLDPE | 4 | 0.90 | 115 | 1-butene (8.2) | 25 |
| 3 | LDPE | 2 | 0.92 | 110 | — | 44 |
| 4 | LLDPE | 2 | 0.92 | 124 | 1-butene (3.4) | 46 |
| 5 | MDPE | 2 | 0.94 | 129 | 1-butene (1.3) | 59 |

TABLE A₁-continued

| | | Ethylene Polymer | | | |
|---|---|---|---|---|---|
| No. | Polymer Type | MFR (g/10 min.) | Density (g/cm³) | Melting Point (°C.) | Kind of α-Olefin (content mol %) | Degree of Crystallinity (%) |
| 6 | HDPE | 2.5 | 0.95 | 133 | propylene (0.6) | 70 |
| 7 | EBM | 0.9 | 0.88 | 72 | 1-butene (12) | 15 |

TABLE A₂

| | | Modified Ethylene Polymer | | | | |
|---|---|---|---|---|---|---|
| No. | Base Polymer | MFR (g/10 min.) | Density (g/cm³) | Maleic Anhydride Content (wt %) | Kind of α-Olefin | α-Olefin Content (mol %) | Melting Point (°C.) |
| a | LLDPE | 1 | 0.92 | 1.5 | 1-butene | 3.4 | 124 |
| a' | LLDPE | 1.2 | 0.92 | 0.3 | 1-butene | 3.4 | 124 |
| b | HDPE | 1 | 0.94 | 1.3 | propylene | 0.8 | 129 |
| c | EBM | 2.8 | 0.88 | 1.5 | 1-butene | 14 | 72 |

TABLE B

| | | Tackifier | | |
|---|---|---|---|---|
| No. | Polymer Type | Trade Name | Softening point (°C.) | Bromine Number |
| A | Aliphatic Petroleum Resin | PICCOTAC[a] | 115 | — |
| B | Partially Hydrogenated Aromatic Petroleum Resin | ARKON-M115[b] | 115 | — |
| C | Hydrogenated Aromatic Petroleum Resin | ARKON-P115[c] | 115 | 2 |
| D | Hydrogenated Aromatic Petroleum Resin | ARKON-P140[d] | 140 | 2 |
| E | Hydrogenated Aliphatic/Aromatic Petroleum Resin | ESCOREZ ECR233E[e] | 128 | <10 |
| F | Hydrogenated Terpene | CLEARON-P115[f] | 115 | <10 |

NOTE:
a: A product of Rika Hercules, Ltd.
b~d: Produts of Arakawa Chemical Industries, Ltd.
e: A product of Tohnex Co., Ltd.
f: A product of Yasuhara Chemical Industry, Co., Ltd.

TABLE C

| | | | Block Copolymer | | | | |
|---|---|---|---|---|---|---|---|
| No. | Polymer Type | Density (g/cm³) | Number Average Molecular Weight (in PS conversion) | MFR at 230° C.[a] | Styrene Content (wt %) | Hydrogenation Ratio[b] | Trade Name |
| I | SEBS | 0.91 | 130000 | 1.9 | 29 | 99 | KRATON-G1652[c] |
| II | SEBS | 0.89 | 50000 | 0.5 | 20 | 100 | TUFTEC-H1071[d] |
| III | SEPS | 0.93 | 51000 | 3.4 | 30 | 98 | SEPTON-2007[e] |
| IV | SEPS | 0.95 | 65000 | (25) | 65 | 98 | SEPTON-2104[f] |
| V | SEP | 0.93 | 130000 | (0.2) | 50 | 98 | SEPTON-1050[g] |

Note;
a: Values in () of MFR column are measured at 200° C.
b: Hydrogenation Ratio are calculated using the Iodine number method.
c: A product of Shell Chemical Ltd.
d: A product of Asahi Chemical Industry Co., Ltd.
e~g: Products of Kuraray Co., Ltd.

TABLE D₁

| | | Ethylene/α-Olefin Random Copolymer | | | | | |
|---|---|---|---|---|---|---|---|
| No. | Polymer Type | MFR (g/10 min.) | Density (g/cm³) | Kind of α-Olefin | α-Olefin Content (mol %) | Degree of Crystallinity (%) | Melting Point (°C.) |
| ① | EPR | 2 | 0.86 | propylene | 16 | 4 | 43 |
| ② | EPR | 0.2 | 0.86 | propylene | 20 | 1 | 20 |
| ③ | EPR | 0.1 | 0.87 | propylene | 22 | 2 | 37 |

TABLE D₂

| No. | Base Polymer | MFR (g/10 min.) | Density (g/cm³) | Modified Ethylene/α-Olefin Random Copolymer | | | Melting Point (°C.) |
| | | | | Maleic Anhydride Content (wt %) | Kind of α-Olefin | α-Olefin Content (mol %) | |
| --- | --- | --- | --- | --- | --- | --- | --- |
| d | EPR | 3.2 | 0.86 | 1.4 | propylene | 16 | 42 |

TABLE 1

| | | Example-1 | | Example-2 | | Example-3 | | Example-4 | | Example-5 | | Example-6 | |
| | | No. | Contents | No. | Contents | No. | Contents | No. | Contents | No. | Contents | No. | Contents |
| --- | --- | --- | --- | --- | --- | --- | --- | --- | --- | --- | --- | --- | --- |
| Composition | | | | | | | | | | | | | |
| Ethylene Polymer | (Table A₁) | 1 | 50 | 1 | 60 | 2 | 50 | 3 | 50 | 4 | 50 | — | — |
| Tackifier | (Table B) | C | 20 | C | 20 | C | 20 | C | 20 | C | 20 | C | 20 |
| Styrene Elastomer | (Table C) | II | 20 | II | 20 | II | 20 | II | 20 | II | 20 | II | 20 |
| Modified Ethylene Polymer | (Table A₂) | a | 10 | — | — | a | 10 | a | 10 | a | 10 | a' | 60 |
| Ethylene/α-Olefin Random Copolymer | (Table D₁) | — | | — | | — | | — | | — | | — | |
| Adhesive Strength | | | | | | | | | | | | | |
| to PET | at 23° C. | | 2.6 | | 2.4 | | 2.7 | | 2.5 | | 2.3 | | 2.2 |
| | at 60° C. | | 1.6 | | 1.3 | | 1.7 | | 1.3 | | 1.5 | | 1.5 |
| | at 23° C. after boiling | | 2.5 | | 2.2 | | 2.6 | | 2.6 | | 2.0 | | 2.0 |
| to EVOH | at 23° C. | | 2.4 | | 0.3 | | 2.3 | | 2.4 | | 2.0 | | 2.0 |
| | at 60° C. | | 1.3 | | — | | 1.4 | | 1.5 | | 1.8 | | 1.8 |

| | | Example-7 | | Example-8 | | Example-9 | | Example-10 | | Example-11 | |
| | | No. | Contents | No. | Contents | No. | Contents | No. | Contents | No. | Contents |
| --- | --- | --- | --- | --- | --- | --- | --- | --- | --- | --- | --- |
| Composition | | | | | | | | | | | |
| Ethylene Polymer | (Table A₁) | 5 | 50 | 2 | 60 | 2 | 40 | 2 | 60 | 2 | 40 |
| Tackifier | (Table B) | C | 20 | C | 10 | C | 30 | C | 20 | C | 20 |
| Styrene Elastomer | (Table C) | II | 20 | II | 20 | II | 20 | II | 10 | II | 30 |
| Modified Ethylene Polymer | (Table A₂) | a | 10 | a | 10 | a | 10 | a | 10 | a | 10 |
| Ethylene/α-Olefin Random Copolymer | (Table D₁) | | — | | — | | — | | — | | — |
| Adhesive Strength | | | | | | | | | | | |
| to PET | at 23° C. | | 1.9 | | 1.2 | | 2.7 | | 1.5 | | 1.8 |
| | at 60° C. | | 1.2 | | 0.8 | | 1.6 | | 1.0 | | 1.0 |
| | at 23° C. after boiling | | 1.9 | | 1.3 | | 2.6 | | 1.4 | | 1.5 |
| to EVOH | at 23° C. | | 1.9 | | 1.7 | | 2.3 | | 1.8 | | 1.8 |
| | at 60° C. | | 1.1 | | 1.0 | | 1.3 | | 1.1 | | 1.0 |

| | | Example-12 | | Example-13 | | Example-14 | | Example-15 | | Example-16 | | Example-17 | |
| | | No. | Contents | No. | Contents | No. | Contents | No. | Contents | No. | Contents | No. | Contents |
| --- | --- | --- | --- | --- | --- | --- | --- | --- | --- | --- | --- | --- | --- |
| Composition | | | | | | | | | | | | | |
| Ethylene Polymer | (Table A₁) | 5 | 40 | 7 | 50 | 2 | 50 | 2 | 50 | 2 | 50 | 2 | 50 |
| Tackifier | (Table B) | C | 20 | C | 20 | C | 20 | C | 20 | C | 20 | C | 20 |
| Styrene Elastomer | (Table C) | II | 20 | II | 20 | II | 20 | II | 20 | II | 20 | II | 20 |
| Modified Ethylene Polymer | (Table A₂) | a | 10 | a | 10 | b | 10 | c | 10 | — | — | — | — |
| Ethylene/α-Olefin Random Copolymer | (Table D₁) | ② | 10 | — | — | — | — | — | — | — | — | ① | 5 |
| Modified Ethylene/α-Olefin Random Copolymer | (Table D₂) | | | | | | | | | d | 10 | d | 5 |
| Adhesive Strength | | | | | | | | | | | | | |
| to PET | at 23° C. | | 2.2 | | 2.3 | | 2.4 | | 2.0 | | 1.6 | | 1.6 |
| | at 60° C. | | 1.3 | | 1.0 | | 1.3 | | 1.1 | | 0.9 | | 0.9 |
| | at 23° C. after boiling | | 2.0 | | 2.3 | | 2.3 | | 1.9 | | 1.6 | | 1.6 |
| to EVOH | at 23° C. | | 2.1 | | 2.6 | | 2.3 | | 2.0 | | 1.7 | | 1.7 |
| | at 60° C. | | 1.2 | | 1.1 | | 1.3 | | 1.1 | | 1.0 | | 1.0 |

TABLE 1-continued

| | | Example-18 | | Example-19 | | Example-20 | | Example-21 | | Example-22 | |
|---|---|---|---|---|---|---|---|---|---|---|---|
| | | No. | Contents | No. | Contents | No. | Contents | No. | Contents | No. | Contents |
| Composition | | | | | | | | | | | |
| Ethylene Polymer | (Table A₁) | 2 | 50 | 2 | 50 | 2 | 50 | 2 | 50 | 2 | 50 |
| Tackifier | (Table B) | A | 20 | B | 20 | D | 20 | E | 20 | F | 20 |
| Styrene Elastomer | (Table C) | II | 20 | II | 20 | II | 20 | II | 20 | II | 20 |
| Modified Ethylene Polymer | (Table A₂) | a | 10 | a | 10 | a | 10 | a | 10 | a | 10 |
| Ethylene/α-Olefin Random Copolymer | (Table D₁) | — | | — | | — | | — | | — | |
| Adhesive Strength | | | | | | | | | | | |
| to PET | at 23° C. | | 1.8 | | 2.2 | | 2.4 | | 2.9 | | 1.3 |
| | at 60° C. | | 0.8 | | 1.1 | | 1.1 | | 1.6 | | 0.8 |
| | at 23° C. after boiling | | 2.0 | | 2.2 | | 2.3 | | 2.7 | | 1.3 |
| to EVOH | at 23° C. | | 2.1 | | 2.2 | | 2.3 | | 2.5 | | 1.5 |
| | at 60° C. | | 1.1 | | 1.0 | | 1.3 | | 1.5 | | 1.0 |

| | | Example-23 | | Example-24 | | Example-25 | | Example-26 | | Example-27 | |
|---|---|---|---|---|---|---|---|---|---|---|---|
| | | No. | Contents | No. | Contents | No. | Contents | No. | Contents | No. | Contents |
| Composition | | | | | | | | | | | |
| Ethylene Polymer | (Table A₁) | 2 | 50 | 2 | 50 | 2 | 50 | 2 | 50 | 5 | 40 |
| Tackifier | (Table B) | C | 20 | C | 20 | C | 20 | C | 20 | C | 20 |
| Styrene Elastomer | (Table C) | I | 20 | III | 20 | IV | 20 | V | 20 | II | 20 |
| Modified Ethylene Polymer | (Table A₂) | a | 10 | a | 10 | a | 10 | a | 10 | a | 10 |
| Ethylene/α-Olefin Random Copolymer | (Table D₁) | — | | — | | — | | — | | ③ | 10 |
| Adhesive Strength | | | | | | | | | | | |
| to PET | at 23° C. | | 2.6 | | 2.1 | | 1.8 | | 1.6 | | 2.0 |
| | at 60° C. | | 1.4 | | 1.2 | | 1.1 | | 1.1 | | 1.2 |
| | at 23° C. after boiling | | 2.5 | | 1.8 | | 1.9 | | 1.5 | | 1.9 |
| to EVOH | at 23° C. | | 2.3 | | 2.2 | | 1.9 | | 1.5 | | 1.8 |
| | at 60° C. | | 1.6 | | 1.3 | | 1.1 | | 1.0 | | 1.2 |

TABLE 2

| | Example 28 | | |
|---|---|---|---|
| | Evaluation | Adhesive Strength | |
| Kind of Adherend | Method | 23° C. | 60° C. |
| Kodar PETG 6763 | Method A | 2.5 | 1.6 |
| DURANEX 660LP | Method A | 2.3 | 1.8 |
| IUPILON E2000 | Method A | 1.8 | 1.4 |
| BAREX 3000 | Method A | 1.2 | 0.8 |
| MX NYLON 6001 | Method A | 2.6 | 2.3 |
| DENKASTYROL HRM-5 | Method B | 1.1 | 0.7 |
| DENKASTYROL HI-G-2 | Method B | 1.3 | 0.8 |
| MITSUBISHI POLYPRO PY220 | Method B | unseparable | unseparable |
| MITSUBISHI POLYETHY-HD BZ50A | Method B | unseparable | unseparable |
| MITSUBISHI POLYETHY-LD NC82 POLYLAC PA747A | Method A | 1.6 | 1.2 |

TABLE 3

| | | | Adhesive Strength |
|---|---|---|---|
| Adhesive Properties | to PET | at 23° C. | 1.9 |
| | | at 60° C. | 1.2 |
| | | at 23° C. after boiling | 1.9 |
| | to EVOH | at 23° C. | 1.9 |
| | | at 60° C. | 1.4 |

TABLE 4

|  |  | Comp. Ex.-1 | | Comp. Ex.-2 | | Comp. Ex.-3 | | Comp. Ex.-4 | |
| --- | --- | --- | --- | --- | --- | --- | --- | --- | --- |
|  |  | No. | Contents | No. | Contents | No. | Contents | No. | Contents |
| Composition |  |  |  |  |  |  |  |  |  |
| Ethylene Polymer | (Table A₁) | 6 | 50 | — | — | 2 | 70 | 2 | 70 |
| Tackifier | (Table B) | C | 20 | C | 20 | — | — | C | 20 |
| Styrene Elastomer | (Table C) | II | 20 | II | 20 | II | 20 | — | — |
| Modified Ethylene Polymer | (Table A₂) | a | 10 | a | 10 | a | 10 | a | 10 |
| Ethylene/α-Olefin Random Copolymer | (Table D₁) | — | — | ① | 50 | — | — | — | — |
| Adhesive Strength |  |  |  |  |  |  |  |  |  |
| to PET | at 23° C. |  | 0.2 |  | 2.1 |  | 0 |  | 0.3 |
|  | at 60° C. |  | — |  | 0.2 |  | — |  | — |
|  | at 23° C. after boiling |  | — |  | peel off during boiling |  | — |  | — |
| to EVOH | at 23° C. |  | 1.2 |  | 2.3 |  | 1.3 |  | 1.5 |
|  | at 60° C. |  | 0.6 |  | 0.2 |  | 0.8 |  | 0.6 |

As described above, the adhesive resin composition of the present invention shows excellent adhesion to various materials at a wide temperature range from ordinary temperatures to higher temperatures. Accordingly, this adhesive resin composition is useful for laminates for packaging films, thermoforming cups, bottles prepared by blow or injection molding which need excellent heat resistance, gas barrier properties, moisture barrier, transparency and stiffness and are useful for packaging or filling food and medicines. This adhesive resin composition can also be used for lamination onto unwoven cloths and metals in the textile and industry fields.

What is claimed is:

1. An adhesive resin composition for a multi-layered resin laminate, consisting essentially of a mixture of an ethylene polymer having a melting point of 70° to 132° C., a density of 0.88 to 0.945 g/cm$^3$ and a melt flow rate (MFR) of 0.05 to 50 g/10 min., and a modified product which is obtained by graft-modifying said ethylene polymer with an unsaturated carboxylic acid or a derivative thereof grafted thereto in an amount of 0.01 to 10 wt % (component A); a tackifier (component B); and a block copolymer containing at least one polymer block mainly composed of a vinyl aromatic hydrocarbon and at least one polymer block mainly composed of a conjugated diene or a hydrogenated product thereof (component C), wherein the contents of the components A, B and C are 40 to 70 wt %, 5 to 30 wt % and 5 to 30 wt %, respectively, based on the total amount of the components A, B and C.

2. The composition according to claim 1, which further contains at least one ingredient selected from the group consisting of an ethylene/α-olefin random copolymer having a melting point of not higher than 60° C., a density of 0.85 to 0.87 g/cm$^3$ and an MFR of 0.1 to 50 g/10 min., and a product obtained by graft-modifying said copolymer with an unsaturated carboxylic acid or its derivative (component D) in an amount of 1 to 50 wt % based on the total amount of the components A, B and C.

3. The composition according to claim 1, wherein said ethylene polymer has a melting point of 80° to 132° C., a density of 0.89 to 0.94 g/cm$^3$ and an MFR of 0.1 to 30 g/10 min.

4. The composition according to claim 1, wherein said ethylene polymer has a crystallinity, determined by X-ray diffraction, of 13 to 65%.

5. The composition according to claim 1, wherein said modified ethylene polymer is one produced by modifying said ethylene polymer with maleic acid or its anhydride.

6. The composition according to claim 1, wherein said modified ethylene polymer is one produced by graft-modifying said ethylene polymer with maleic anhydride and contains maleic anhydride grafted thereto in an amount of 0.05 to 7 wt %.

7. The composition according to claim 1, wherein said tackifier has a softening point of 70° to 150° C.

8. The composition according to claim 1, wherein said tackifier is selected from the group consisting of petroleum resins, rosin, terpene resins and hydrogenated products thereof.

9. The composition according to claim 8, wherein said petroleum resin is an aliphatic petroleum resin, an aromatic petroleum resin, or an aliphatic/aromatic petroleum resin which has a degree of hydrogenation of at least 80%.

10. The composition according to claim 1, wherein said block copolymer component C) comprises a styrene polymer block and a butadiene polymer block, an isoprene polymer block or a butadiene/isoprene polymer block.

11. The composition according to claim 10, wherein said block copolymer contains 10 to 80 wt % of a styrene polymer block.

12. The composition according to claim 10, wherein said block copolymer contains a butadiene or isoprene polymer block of which at least 90% is hydrogenated.

13. The composition according to claim 1, wherein said block copolymer has a number average molecular weight of 20,000 to 300,000.

14. The composition according to claim 2, wherein said ethylene/α-olefin random copolymer (component D) is an ethylene/propylene elastomer.

15. An adhesive resin composition for a multi-layered resin laminate, consisting essentially of a modified product which is obtained by graft-modifying an ethylene polymer with an unsaturated carboxylic acid or a derivative thereof grafted thereto in an amount of 0.01 to 10 wt %, said ethylene polymer having a melting point of 70° to 132° C. a density of 0.88 to 0.945 g/cm$^3$ and a melt flow rate (MFR) of 0.05 to 50 g/10 min. (component A); a tackifier (component B); and a block copolymer containing at least one polymer block mainly composed of a vinyl aromatic hydrocarbon and at least one polymer block mainly composed of a conjugated diene or a hydrogenated product thereof (component C), wherein the contents of the components A, B and C are 40 to 70 wt %, 5 to 30 wt % and 5 to 30 wt %, respectively, based on the total amount of the components A, B and C.

16. The composition according to claim 15, which further contains at least one ingredient selected from the group consisting of an ethylene/α-olefin random copolymer having a melting point of not higher than 60° C., a density of 0.85 to 0.87 g/cm$^3$ and an MFR of 0.1 to 50 g/10 min., and a modified product obtained by graft-modifying said copolymer with an unsaturated carboxylic acid or its derivative (component D) in an amount of 1 to 50 wt % based on the total amount of the components A, B and C.

17. The composition according to claim 15, wherein said ethylene polymer has a melting point of 80° to 132° C. a density of 0.89 to 0.94 g/cm$^3$ and an MFR of 0.1 to 30 g/10 min.

18. The composition according to claim 15, wherein said ethylene polymer has a crystallinity, determined by X-ray diffraction, of 13 to 65%.

19. The composition according to claim 15, wherein said modified ethylene polymer is one produced by modifying said ethylene polymer with maleic acid or its anhydride.

20. The composition according to claim 15, wherein said modified ethylene polymer is one produced by graft-modifying said ethylene polymer with maleic anhydride and contains maleic anhydride grafted thereto in an amount of 0.05 to 7 wt %.

21. The composition according to claim 15, wherein said tackifier has a softening point of 70° to 150° C.

22. The composition according to claim 15, wherein said tackifier is selected from the group consisting of petroleum resins, rosin, terpene resins and hydrogenated products thereof.

23. The composition according to claim 22, wherein said petroleum resin is an aliphatic petroleum resin, an aromatic petroleum resin, or an aliphatic/aromatic petroleum resin which has a degree of hydrogenation of at least 80%.

24. The composition according to claim 15, wherein said block copolymer (component C) comprises a styrene polymer block and a butadiene polymer block, an isoprene polymer block or a butadiene/isoprene polymer block.

25. The composition according to claim 24, wherein said block copolymer contains 10 to 80 wt % of a styrene polymer block.

26. The composition according to claim 24, wherein said block copolymer contains a butadiene or isoprene polymer block of which at least 90% is hydrogenated.

27. The composition according to claim 15, wherein said block copolymer has a number average molecular weight of 20,000 to 300,000.

28. The composition according to claim 16, wherein said ethylene/α-olefin random copolymer (component D) is an ethylene/propylene elastomer.

* * * * *